US010395291B2

(12) United States Patent
Olexa

(10) Patent No.: US 10,395,291 B2
(45) Date of Patent: Aug. 27, 2019

(54) SYSTEM AND METHOD FOR NAVIGATING A COLLECTION OF EDITORIAL CONTENT

(71) Applicant: Vladimir Olexa, Oakland, CA (US)

(72) Inventor: Vladimir Olexa, Oakland, CA (US)

(73) Assignee: CBS Interactive Inc., San Francisco, CA (US)

( * ) Notice: Subject to any disclaimer, the term of this patent is extended or adjusted under 35 U.S.C. 154(b) by 1125 days.

(21) Appl. No.: 13/691,692

(22) Filed: Nov. 30, 2012

(65) Prior Publication Data
US 2013/0091036 A1 Apr. 11, 2013

Related U.S. Application Data

(63) Continuation of application No. 12/852,241, filed on Aug. 6, 2010, now Pat. No. 8,346,623.

(51) Int. Cl.
G06Q 30/00 (2012.01)
G06Q 30/06 (2012.01)
G06Q 30/02 (2012.01)

(52) U.S. Cl.
CPC ......... *G06Q 30/0623* (2013.01); *G06Q 30/02* (2013.01); *G06Q 30/0282* (2013.01); *G06Q 30/06* (2013.01)

(58) Field of Classification Search
CPC .... G06Q 30/02; G06Q 30/0282; G06Q 30/06; G06Q 30/0623
USPC ............................ 705/26.1, 26.61, 26.7, 27.1
See application file for complete search history.

(56) References Cited

U.S. PATENT DOCUMENTS

| 7,689,933 | B1 | 3/2010 | Parsons |
| 7,797,635 | B1* | 9/2010 | Denise .......................... 715/738 |
| 8,019,656 | B2 | 9/2011 | Baran et al. |
| 8,161,030 | B2 | 4/2012 | Ruhl et al. |
| 2003/0105682 | A1 | 6/2003 | Dicker et al. |
| 2006/0129446 | A1* | 6/2006 | Ruhl ................. G06F 17/30873 705/306 |
| 2008/0109232 | A1 | 5/2008 | Musgrove et al. |
| 2009/0063247 | A1 | 3/2009 | Burgess et al. |

(Continued)

OTHER PUBLICATIONS

Leahul, Dan, "How to . . . Create a Website That Really Works," Revolution, suppl. The Insider's Guide to Digital Marketing, Nov. 2009.

*Primary Examiner* — Mila Airapetian
(74) *Attorney, Agent, or Firm* — Rimon PC

(57) ABSTRACT

Systems and methods for easily navigating a collection of editorial content related to products are described. Embodiments of the invention provide seamless, continuous, structured access to relevant product reviews. Users of embodiments of the invention can advance from one product review to another by selecting navigational buttons representing the previous and next product reviews from within a product review currently being viewed. The previous product review represents the review the user was viewing prior to the currently viewed review. The next product review is determined based on a simple learning engine that presents the next relevant product, along with another relevant product that is, for example, either cheaper or more expensive than the review being currently viewed. This simplifies the user experience by eliminating the need to go back to a listing page to research products similar to the product whose review is being viewed.

19 Claims, 7 Drawing Sheets

(56) References Cited

U.S. PATENT DOCUMENTS

2010/0131840 A1    8/2010  Walker et al.
2015/0169699 A1*  6/2015  Gilbert et al.

* cited by examiner

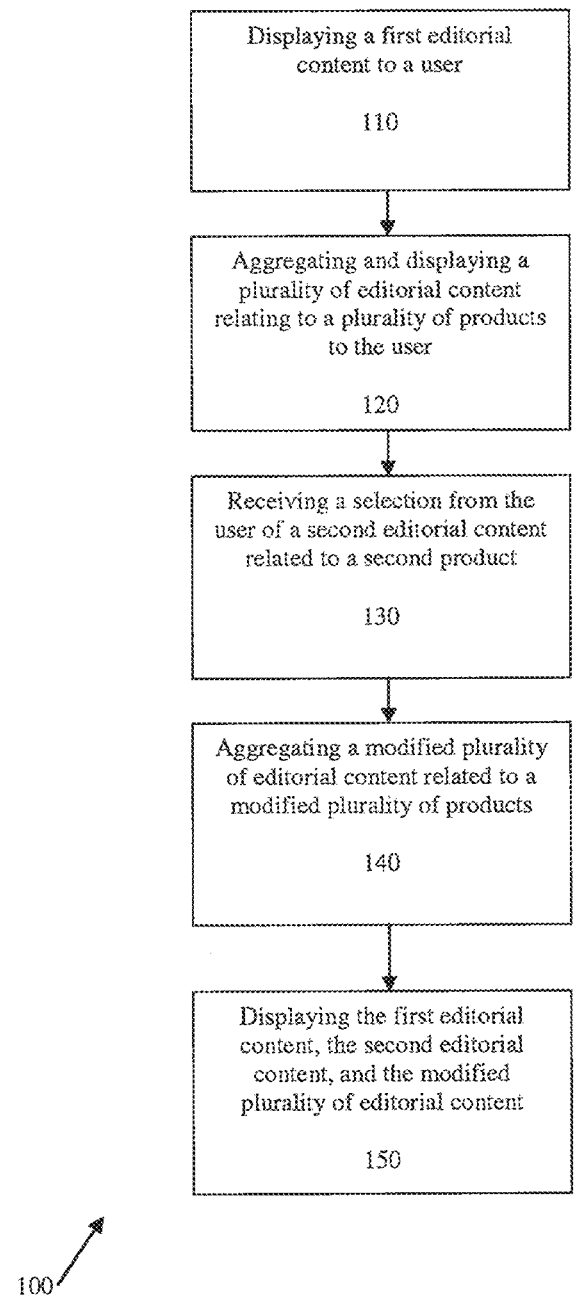

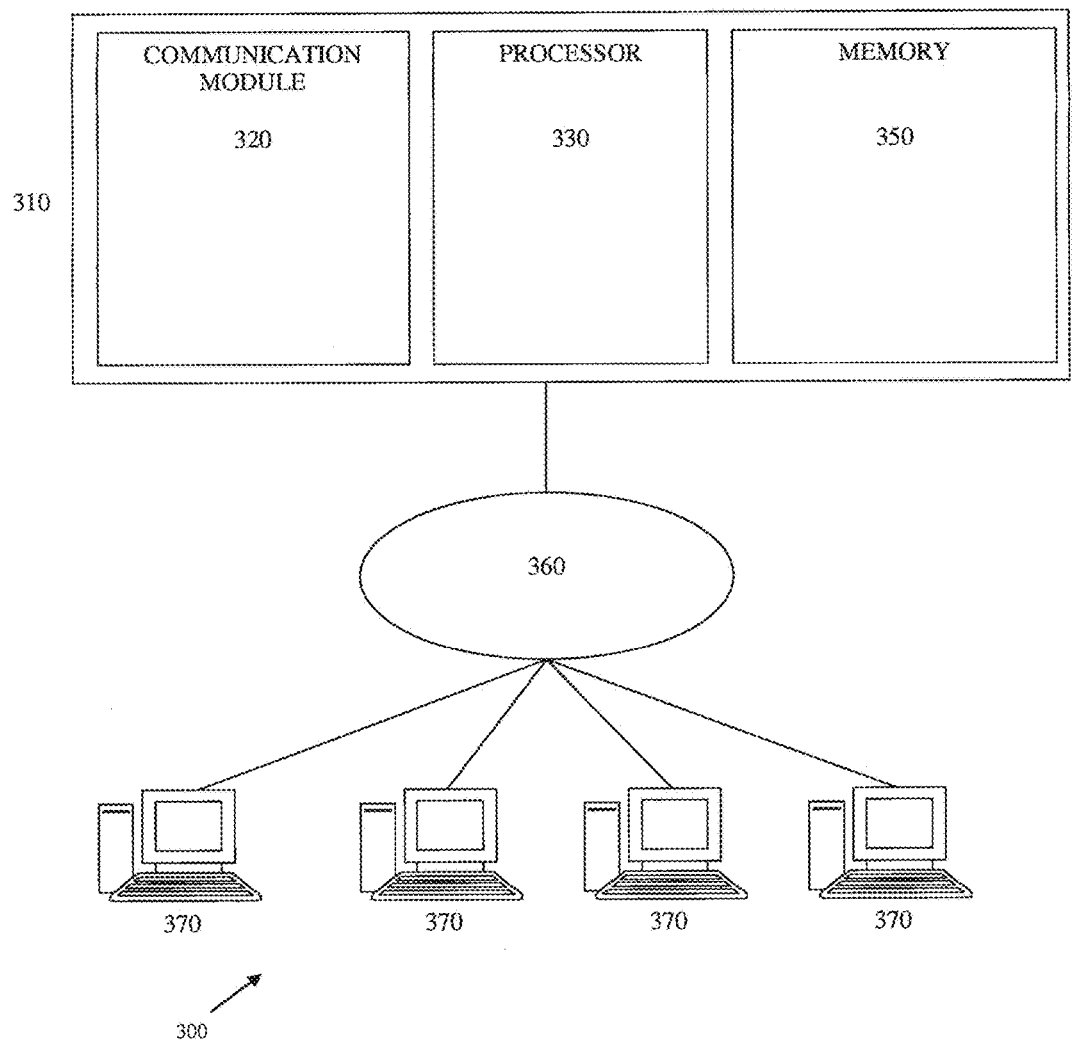

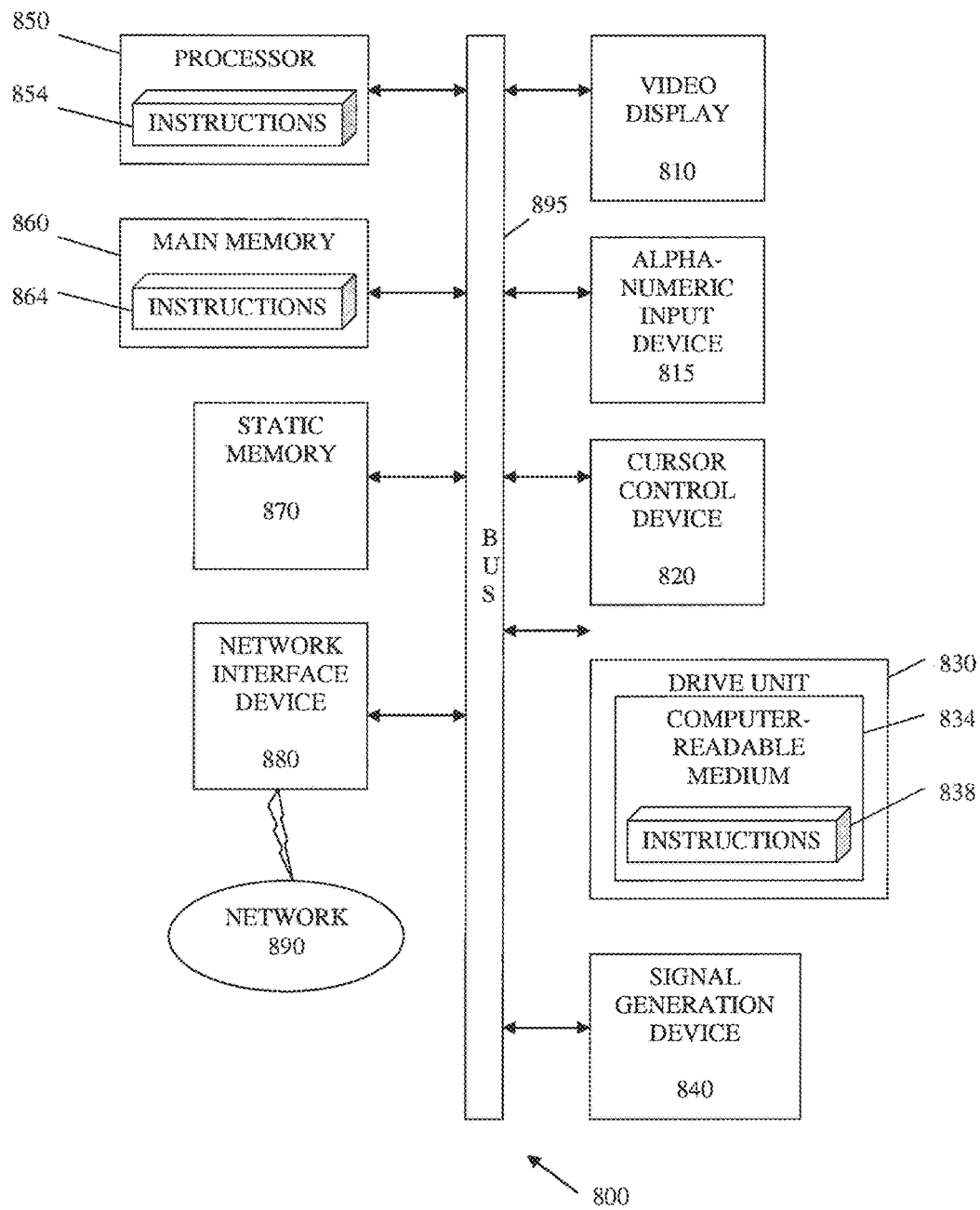

SYSTEM AND METHOD FOR NAVIGATING A COLLECTION OF EDITORIAL CONTENT

This application is a continuation of application Ser. No. 12/852,241, filed on Aug. 6, 2010 (now pending), the contents of which are incorporated herein by reference.

BACKGROUND OF THE INVENTION

Field of the Invention

The present invention relates to content navigation, and more particularly, systems and methods for navigating a collection of editorial content.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Description of Related Art

The Internet has become a primary source of communication amongst millions of individuals in recent years. Web pages are accessed by individuals for nearly every reason under the sun, ranging from education and information exchange, to on-demand entertainment and online dating. The Internet has become particularly prevalent in the advertising, marketing, and retail sectors as a go-to source for widespread, and relatively successful, dissemination of brand information. As a result, more and more businesses have turned to the internet to draw potential consumers, educate the public about their brands, services, and goods, and to act as an always-open marketplace for their products. Although quite beneficial for deal-seeking consumers, the rapid influx of businesses to the internet has saturated many market segments, resulting in fierce competition between similarly-situated companies.

In order to differentiate themselves from competitors and to provide a measure of confidence about the product being considered for purchase, companies often rely on editorial content describing, evaluating, and providing insight into the their products, which can be any tangible or intangible goods or services. Editorial content in this context is usually authored and published by a user of the product. In the case of product reviews, the author is usually (a) a personal consumer of the product or (b) an organizational consumer of the product.

A personal consumer of a product is someone who purchases the product in the regular marketplace for his or her own consumption. Personal consumers come from a wide variety of educational and experiential backgrounds, but almost all acquire, use, and evaluate the product under the normal conditions for which the product was designed. Thus, reviews authored by personal consumers may only consider basic factors, such as merchantability, fitness for a particular or intended purpose, and sensory-acquired features (e.g., design, color, size, weight, smell, texture, taste, sound, etc.). Personal consumers continue to use the product as long as it is functional, optimal, and/or desirable, potentially over the lifetime over the product. Thus, a review from a personal consumer may take into consideration the product's long-term wear and tear, performance, and reliability.

An organizational consumer of the product, such as an agency, business, firm, or representative thereof, purchases a product for business-related purpose or in furtherance of a business-related objective. An example of a business related purpose may include, for example, paper supplies to be used to maintain the business's offices. For the purpose of this application, an organizational consumer may also be a business (or representative of a business) that acquires another business's product for the sole purpose of evaluating it.

This particular type of consumer, commonly referred to as a "product tester", may purchase the product, in the marketplace or at wholesale, for the primary purpose of reviewing it. More typically, however, a product tester will acquire the product free of charge from the product's manufacturer. In return, the product tester uses the product to formulate reviews that publicize the user's experience with the product, and thus the product itself. Some product testers are paid by the manufacturer either for or based on their review. In this situation, the opinion and review of the product tester may be skewed favorably toward the product being tested and/or away from competitor products being tested for which they are not being compensated.

Product testers are often relied on to provide an "expert opinion" of the product being evaluated, based on their knowledge and experience with that type of product. Thus, product testers may evaluate the product with higher expectations, considering a breadth of general factors, such as those considered by personal consumers, specific factors that may be advanced or uncommon, and potential design flaws or manufacturing defects. In addition, due to their experience, product testers can consider the product's quality relative to competitor products in their evaluation. However, due to the specialized knowledge required to formulate these reviews, only a very limited number of expert opinions may be available, and are assembled slowly and infrequently in comparison to reviews from personal consumers.

In some cases, product testers receive the product from the manufacturer prior to its widespread release. Reviews published prior to the release of a product may further the advertising objectives of the manufacturer by creating "hype" surrounding the product (and increasing demand for the product) before it is even available. Pre-release reviews may also help potential personal consumers make a purchasing decision about the product, whereas they would otherwise have to purchase the product "blindly", or without basis for confidence that the product is desirable. However, pre-release products are usually given to product testers only weeks, if not days, in advance of the product's release date. Additionally, for all products, testers often want to publish their reviews as quickly as possible. Prompt publication of useful reviews for new products sets a reviews website apart from lagging competitors, creating hype for the website, establishing it as a "go to" source of expert opinions, and generating increased website traffic, all of which potentially increase advertising revenue and the profitability of the website. However, urgent publication deadlines lessen the time the tester has to evaluate the product, eliminating the tester's ability to consider its long-term performance. This is often resolved by the product tester at a later date by adding a second review solely considering long-term performance, or by updating the previous view with long-term results.

Because of the disadvantages inherent in each, potential consumers of a product prefer to consider both reviews authored by personal consumers and those authored by product testers, in order to consider a wide variety of performance data, viewpoints and opinions for a given product. In addition, potential consumers often want to compare multiple reviews written by the same or a similar group of consumers for competing products, in order to establish baseline expectations for that type of product.

However, many conventional review websites require that a user search for different product models individually, then toggle or navigate back and forth between the reviews. This presents particular for potential consumers that are not intimately familiar with the product or product type, as they likely would not know the names and models of competing products offhand. Other conventional sites allow a user to display all products within a particular category, but provide little guidance as to which of the displayed products are most similar to a selected product. Even if users are aware of comparable products, they must individually select each product, then again toggle or navigate back and forth between reviews.

Some sites attempt to remedy this by offering a comparison feature that allows for side-by-side comparison of products within a category using a matrix. However, a user must first determine which products he or she wishes to compare, which can be tedious and time-consuming for a user that does not readily know which competing products are most similar to a given product. Furthermore, if a large number of products are selected, a sizeable matrix is created that is either jammed into a single page for display, or broken up into multiple pages, which again requires toggling and navigation between different products. Results delivered in this fashion are limited to those individual products that were selected by the user; thus, comparable products unknown to a user are not included or brought to the user's attention for consideration. Further, even if additional products are later identified as comparable by the user, they cannot be added to the comparison without running a new search.

SUMMARY OF THE INVENTION

Thus, there is a need in the art for systems and methods for easily navigating a collection of editorial content related to products that allow a potential consumer to intelligently and fully consider similar products from many different manufacturers. This allows a potential consumer to efficiently research products using their reviews, and ultimately select a product to purchase that will best meet their expectations.

This invention meets those needs and others by providing seamless, continuous, structured access to relevant product reviews. Users of embodiments of the invention can advance from one product review to another by selecting navigational buttons representing the previous and next product reviews from within a product review being currently viewed. The previous product review represents the product review the user was viewing prior to the currently viewed review. The next product review is determined based on a simple learning engine that presents the next relevant similar product, along with another product that is, for example, either cheaper or more expensive than the review being currently viewed. This simplifies the user experience by eliminating the need to go back to a listing or search page to research products similar to the product whose review is being viewed.

In one embodiment of the invention, a computer-implemented method for navigating a collection of editorial content associated with products is disclosed, the method comprising displaying a first editorial content related to a first product to a user; aggregating and displaying a plurality of editorial content related to a plurality of products to the user, wherein each product of the plurality of products has at least one attribute shared with the first product and at least one attribute exclusive to the product within the plurality of products; receiving a selection from the user of a second editorial content related to a second product from the plurality of editorial content; aggregating a modified plurality of editorial content related to a modified plurality of products, wherein each product of the modified plurality of products has at least one attribute shared with the second product and at least one attribute exclusive to the product within the modified plurality of products; and displaying the first editorial content, the second editorial content, and the modified plurality of editorial content. A system according to an embodiment of the invention is a computing device comprising a display device, a communication module, and a processor programmed to accomplish these functional steps.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flowchart illustrating the method in accordance with an one embodiment.

FIG. 3 is a system for effecting the method in accordance with an embodiment.

FIG. 5 is a schematic diagram of an exemplary computer system in accordance with an embodiment.

DETAILED DESCRIPTION

Figure 2A:
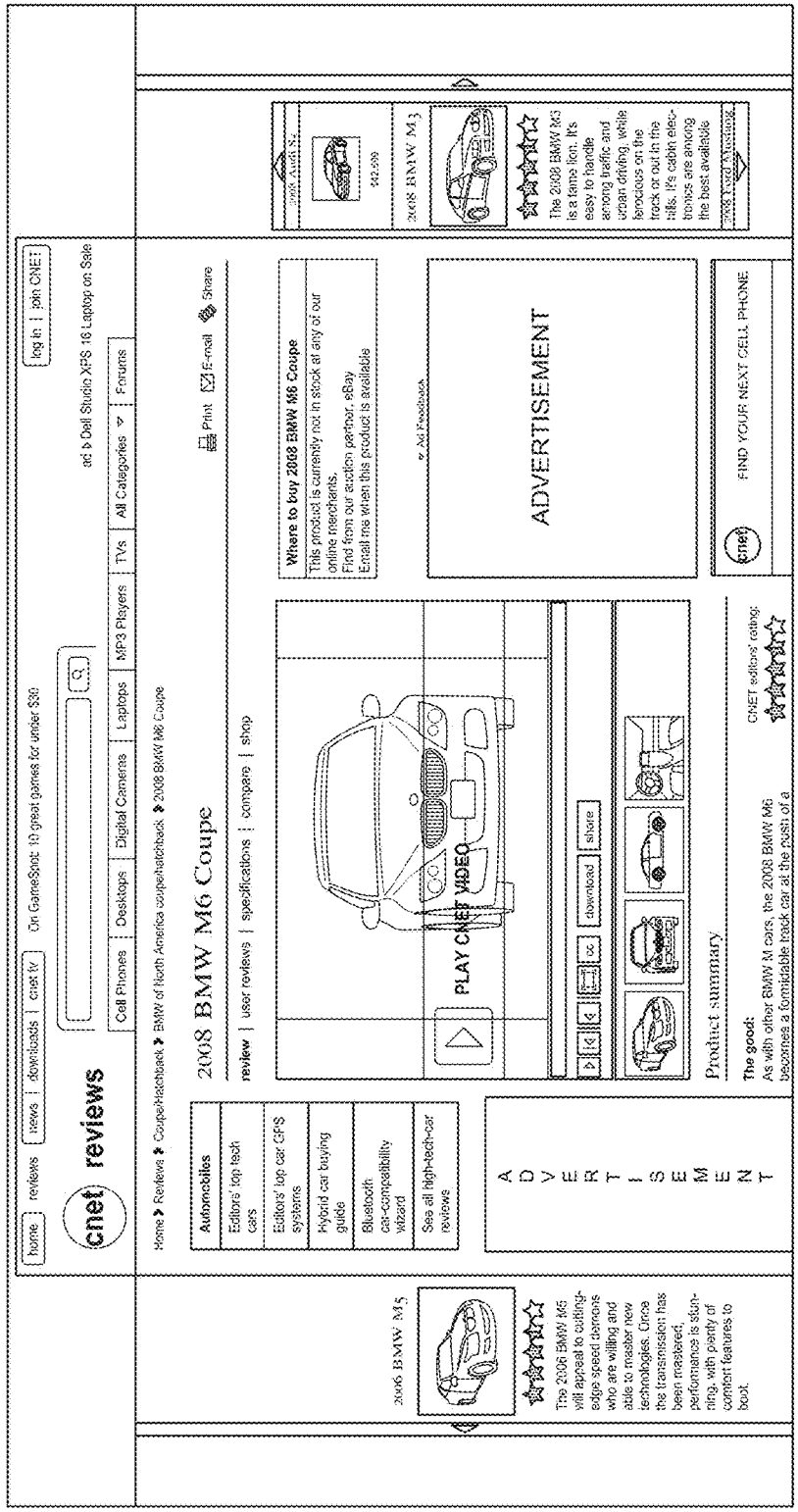
FIG. 2a is a screen shot illustrating an exemplary website created in accordance with the method according to an embodiment.

A system and method for navigating a collection of editorial content associated with products is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement. In some instances, well-known structures and devices are shown in block diagram form in order to avoid unnecessarily obscuring the preferred embodiment.

Referring now to the drawings, wherein like reference numerals designate identical or corresponding parts throughout the several views, FIG. 1 is a flowchart 100 illustrating a computer-implemented method for navigating a collection of editorial content associated with products according to one embodiment. The editorial content within the collection can be any combination of graphical, numerical, symbolical, and/or textual ratings, evaluations, opinions, narratives, or descriptions relating to products.

The products can be any tangible or intangible goods or services. In one embodiment, the products are a physical products, such as, for example, cars, car technology equipment, cell phones, cell phone accessories, computers, digital cameras, MP3 players, MP3 player accessories, appliances, camcorders, components, desktops, games, GPS devices, graphics cards, hard drives (external or internal), disc burners, home audio equipment, home video equipment, internet access equipment, digital voice equipment, televisions, television equipment, laptops, monitors, networking equipment, Wi-Fi equipment, peripherals, printers, security equipment, and web hosting equipment In another embodiment, the products are digital content. Digital content includes any data capable of being recorded onto a computer readable medium, such as, for example, software, multimedia (such as audio, video, images, etc.,), documents, presentations, digital books, spreadsheets, databases, streaming content, websites, and the like. Digital content includes all such content, regardless of whether it is preexisting or created "on the fly", live or recorded, and/or streaming or saved. Further, products can be services, such as travel services and related properties.

Further, the term "products" as used herein can refer to either a single or multiple categories of products (e.g. digital SLR cameras, electronics with HD capabilities, etc.), manufacturers of products (e.g. Nikon™, Sony™, Apple™, etc.), or product models or types of models (e.g. D5000X, Bravia™), either alone or in combination with each other. The collection of editorial content relating to a particular product is ordinarily authored by users of that product, including both personal and organizational consumers, as described above. Thus, exemplary editorial content relating to a product may include, for instance, a review of Nikon™ D5000X digital SLR camera written by a consumer, or a review of Bluray™ technology in general written by a product tester. It is also possible, although less common, that editorial content is submitted by non-users of the product, such as acquaintances of users, potential users, or any other person with no firsthand knowledge of the product. It is also contemplated that editorial content can be automatically generated, such as by a machine.

Each product has one or more associated attributes that define features of that product, including parts, specifications, pricing, warranty, accessories, software, and the like For example, the Canon Vixia™ HF S21 camcorder may have the following attributes: camcorder, 1080 p, 200× zoom, 8-10 megapixels, 1/2.6" optical sensor, CMOS sensor, $1399.99, 0.3 lux min illumination, ½ sec min shutter speed, 1/2000 sec max shutter speed, 1 year limited manufacturer warranty, black, 16.6 oz, 3 in height, 3.8 in depth, 2.9 in height, cables included, etc.

As illustrated in FIG. 1, a first editorial content related to a first product is displayed to a user at processing block 110. The first editorial content may be displayed to the user in response to a user query, which is satisfied by the delivery of the content. For example, a user may click a link for an iPhone 4™ review on www.cnet.com that generates a query on the website for the page. The website's response delivering the iPhone 4™ review to the user will satisfy the user's query.

A processing block 120, a plurality of editorial content related to a plurality of products is aggregated and displayed to the user. A plurality, or collection, of editorial content may refer to either just one or more than one item of editorial content. Similarly, the plurality of products may refer to either just one or more than one product Each item of editorial content in the collection is selected and aggregated according to a set of conditions. In one embodiment, the set of conditions requires that at least two items of editorial content are selected and aggregated: one related to a product having a lower price than the first product, and one related to a product having a higher price than the first product. In another embodiment, a condition is applied at least one item of editorial content is required that has a price within a specified deviation of the first product's price. The selection of this item is intended to show the user at least one product at a similar price point.

In still another embodiment, the set of conditions requires that the product related to the editorial content have at least one attribute in common with, or shared with, the first product. Thus, if, as in the previous example, the iPhone 4™ is the first product, the Motorola DROID™ would satisfy this rule because it has a "smart phone" attribute in common with the iPhone 4™

The set of conditions may further specify that the product related to the editorial content has at least one attribute exclusive to the product from within the plurality of products. In other words, the product must have at least one attribute that none of the other products have that are related to editorial content that has already been selected and aggregated into the collection. This rule prevents duplications of products in the case that more than one piece of editorial content relates to a single product. In other words, it ensures that each product, and thus its related editorial content, is unique.

For example, if the Motorola DROID™ has two reviews, one written by Vladimir and the other by Henry, only one or the other could satisfy the rule. In order words, if Vladimir's review of the Motorola DROID™ has already been selected and added to the collection of editorial content, Henry's review would not be added, because both are related to the same product with the same set of attributes. Thus, in this example, Vladimir's review of the Motorola DROID™ satisfies both conditions, and can be selected for and aggregated into the plurality of editorial content. This process of conditionally selecting and aggregating a collection of qualified editorial content can be repeated for all editorial content within a database, or can be stopped after the collection reaches a certain size. In either case, the aggregated collection of editorial content is displayed to the user, often in conjunction with the first editorial content.

At processing block 130, a selection from the user of a second editorial content related to a second product from the plurality of editorial content is received. Continuing the above example, the user may select Vladimir's review of the Motorola DROID™.

At processing block 140, a modified plurality of editorial content related to a modified plurality of products is aggregated, in a similar fashion as described above with respect to processing block 120. However, in at this step, each item of editorial content is selected and aggregated only if (a) its related product has at least one attribute shared with the second product, and (b) its related product has at least one attribute exclusive to the product within the modified plurality of products. If an item of editorial content meets each of the requite conditions, it is possible for the item to be appear in both the plurality of editorial content and the modified plurality of editorial content.

At processing block 150, the first editorial content, the second editorial content, and the modified plurality of editorial content is displayed to the user, in a manner such as that shown in FIG. 2a, for example. It is contemplated that the method represented by processing blocks 110, 120, 130, 140 and 150, can be performed once, as described above, or completed iteratively and in succession an indefinite number of times. In one embodiment, by continually modifying and applying a set of rules to successive user selections (as is done in at processing block 120 and processing block 140 above), a learning engine can refine the selection of editorial content aggregated for the user in subsequent iterations, according to the user's learned preferred products and attributes. Thus, it is contemplated that the selection of editorial content may better reflect the user's preferences as more iterations of the method are performed.

FIG. 2a is screen shot 200 illustrating an exemplary website created in accordance with the method according to an embodiment. For example, screen shot 200 may be displayed to the user at processing block 150 of FIG. 1. Screen shot 200 has second editorial content 210, first editorial content 220, and modified plurality of editorial content 230. Second editorial content 210 represents the review the user is currently viewing in detail, and is related to a "2008 BMW M6 Coupe" product. Second editorial content 210 was selected by the user to view in detail from a previous plurality of editorial content (not shown) that was collected and aggregated based on a previous selection (not shown) of first editorial content 220. Thus, first editorial content 220 represents the review that the user was previously viewing in detail. Modified plurality of editorial content 230 represents suggestions to the user of editorial content to view next.

Figure 2B:
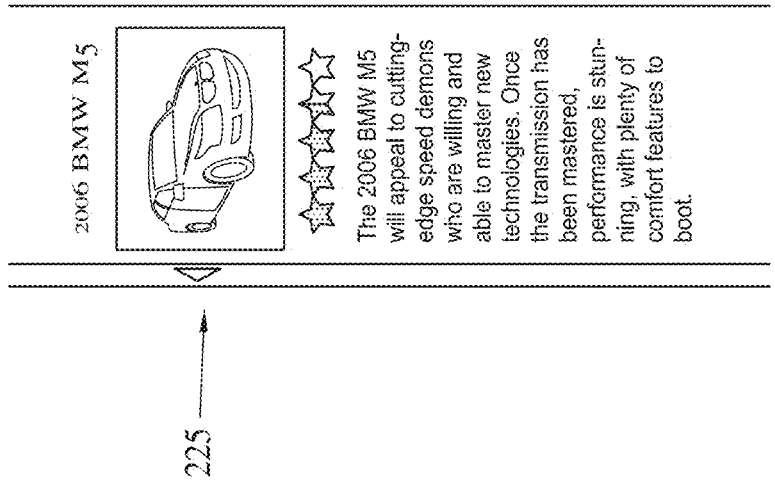
FIG. 2b is a magnified left panel of the screen shot of FIG. 2b according to an embodiment.

FIG. 2b is a magnified view of first editorial content 220 from screen shot 200. In this embodiment, first editorial content 220 is related to a "2006 BMW M5" product and, as discussed previously, represents the review that the user was previously reviewing in detail. First editorial content 220 has back button 225 that can be selected to again maximize, or view in detail, first editorial content 220. Although shown as a left facing arrow, back button 225 can be graphical, numerical, symbolical, textual, or any combination thereof, that allows a user to maximize first editorial content 220.

Figure 2C:
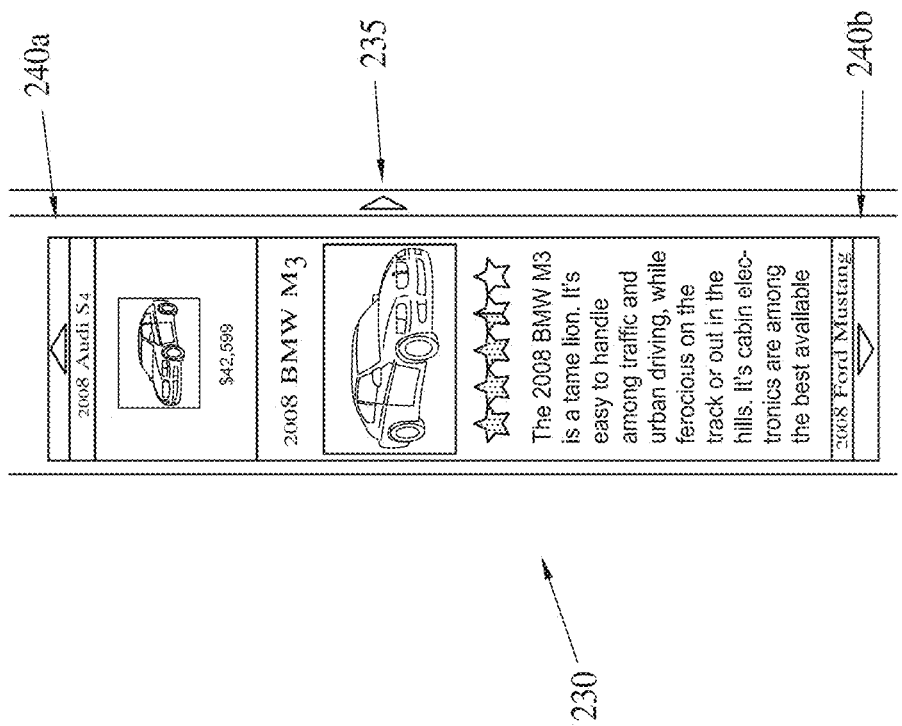
FIG. 2c is a magnified right panel of the screen shot of FIG. 2c in accordance with an embodiment.

FIG. 2c is a magnified view of modified plurality of editorial content 230 from screen shot 200. In this embodiment, modified plurality of editorial content comprises multiple unique items of editorial content, in which three (related to a "2008 Audi S4" product, a "2008 BMW M3" product, and a "2008 Ford Mustang" product, respectively) are shown. In other embodiments, however, modified plurality of editorial content 230 can comprise a single item of editorial content.

As described further above, modified plurality of editorial content 230 is assembled in accordance with a set of conditions. In this embodiment, the set of conditions required that the products associated with items of content within modified plurality of editorial content 230 have at least one attribute shared with the second product (the "2008 BMW M6 Coupe") and at least one attribute exclusive to the product within modified plurality of editorial content 230. Thus, items of editorial content relating to the "2008 Audi S4", the "2008 BMW M3", and the "2008 Ford Mustang", which have been aggregated and displayed to the user, satisfy both of these conditions.

In other words, each of the "2008 Audi S4", "2008 BMW M3", and "2008 Ford Mustang" have at least one attribute in common with the "2008 BMW M6 Coupe", such as, for example, "model year 2008", "coupe", or "car". Additionally, each of "2008 Audi S4", "2008 BMW M3", and "2008 Ford Mustang" have at least one attribute that the other two do not have (assuming, for this example only, that modified plurality of editorial content 230 consists only of three reviews related to these three products). For example, each of the three products may have an attribute of their make ("Audi", "BMW", and "Ford", respectively), which none of the products have in common with each other.

Although only three are illustrated and described in the immediate above example, modified plurality of editorial content 230 may include additional items of editorial content (not shown). The user can view the additional content scrolling through modified plurality of editorial content 230 by selecting up button 240a and/or down button 240b. The user can also use up button 240a and/or down button 240b to highlight a particular item of editorial content. Although shown and descriptively named as upward and downward facing arrows, respectively, up button 240a and down button 240 can be graphical, numerical, symbolical, textual, or any combination thereof, that allows a user to scroll through items of editorial content within modified plurality of editorial content 230.

Modified plurality of editorial content 230 also has forward button 235 that can be selected to maximize the highlighted item of editorial content. In this case, a user selection of forward button 230 would maximize the review relating to the "2008 BMW M3" product. Again, although shown as a right-facing arrow, forward button 235 can be graphical, numerical, symbolical, textual, or any combination thereof, that allows a user to maximize a selected review within modified plurality of editorial content 230.

FIG. 3 illustrates system 300 of an embodiment for effecting the functions described above. Server 310 is connected over network 360 to a plurality of user systems 370. Server 310 includes communication module 320, processor 330, and memory 350, which are all in communication with one another. Users at the plurality of user systems 370 access server 310 to navigate a collection of editorial content associated with products. Server 310 is typically a computer system, and may be an HTTP (Hypertext Transfer Protocol) server, such as an Apache server. Server 310 may be built using a standard LAMP or other solution stack. Memory 350 may be any type of storage media that may be volatile or non-volatile memory that includes, for example, read-only memory (ROM), random access memory (RAM), magnetic disk storage media, optical storage media, flash memory devices, and zip drives. Network 360 may be a local area network (LAN), wide area network (WAN), a telephone network, such as the Public Switched Telephone Network (PSTN), an intranet, the Internet, or combinations thereof. The plurality of user systems 370 may be mainframes, minicomputers, personal computers, laptops, personal digital assistants (PDAs), cell phones, netbooks, thin clients, and other computing devices. The plurality of user systems 370 are characterized in that they are capable of being connected to network 360. The plurality of user systems 370 typically include web browsers.

In use, when a user of one of the plurality of user systems 370 wants to, for example, navigate a collection of editorial content associated with products, as described above, a query is communicated to communication module 320 of server 310 over network 360. For example, a signal is transmitted from one of the user systems 370, the signal having a destination address (i.e., address representing the server), a query (i.e., a first editorial content), and a return address (i.e., address representing the user system that initiated the request). Processor 330 accesses memory 350 to retrieve the first editorial content using one or more API requests, and aggregates a plurality of editorial content related to a plurality of products, wherein each product of the plurality of products has at least one attribute shared with the first product and at least one attribute exclusive to the product within the plurality of products. Communication module 340 transmits the first editorial content and the plurality of editorial content to the user over network 360. For example, another signal may be transmitted that includes a destination address corresponding to the return address of the client system, the content responsive to the query (in this case, the first editorial content), and the plurality of editorial content.

If the user selects a second editorial content related to a second product from the plurality of editorial content, another query is communicated to communication module 320 of server 310 over network 360. Processor 330 accesses memory 350 to retrieve the second editorial content using one or more API requests, and aggregates a modified plurality of editorial content related to a modified plurality of products, wherein each product of the modified plurality of products has at least one attribute shared with the second product and at least one attribute exclusive to the product within the modified plurality of products. Communication module 340 transmits the second editorial content and the modified plurality of editorial content to the user over network 360.

The functions of this and other embodiments can be described as modules of computer executable instructions recorded on tangible media. One skilled in the art will appreciate that the modules described herein can be segregated in various manners over various devices, and not limited to those described.

Figure 4:
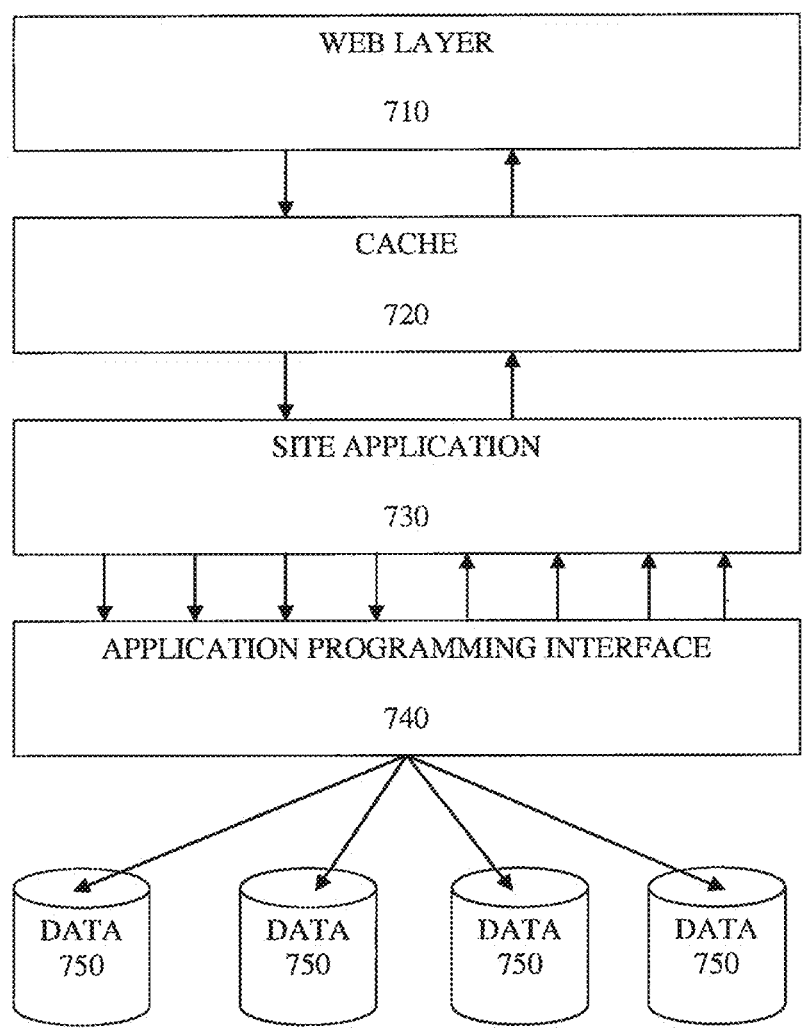
FIG. 4 is a block diagram of a system architecture for implementing the method in accordance with an embodiment.

As shown in another embodiment FIG. 4, system architecture 700 includes web layer 710, cache 720, site application 730, application programming interface 740, and a plurality of data stores 750. It will be appreciated that the system architecture may vary from the illustrated architecture. For example, web layer 710 may directly access data stores 750, the site application may directly access data stores 750, system architecture 700 may not include cache 720, etc., as will be appreciated by those skilled in the art. Web layer 710 is configured to receive user queries for editorial content through a web browser, and return the editorial responsive to the user query, as well as a collection of suggested editorial content. Web layer 710 communicates the user queries to cache 720. Cache 720 is configured to temporarily store editorial content and/or related products that are accessed frequently by web layer 710 and can be rapidly accessed by web layer 710. In one embodiment, cache 720 may be a caching proxy server. Cache 720 communicates the user queries to site application 730.

Site application 730 is configured to update cache 720 and to process user queries received from web layer 719. Site application 730 may identify that of the user's query requests editorial content that corresponds to data from multiple data stores. Site application 730 can then convert the query into a request for data from multiple data stores, and transmit these requests to application programming interface 740. Application programming interface 740 is configured to access the plurality of data stores 750 to collect the data responsive to the plurality of requests from site application 730. The plurality of data stores 750 may include, for example, editorial content, product attribute information, and the like. It will be appreciated that in alternative embodiments only one data store 750 may be provided to store the data.

The data in data stores 750 is provided to application programming interface 740, which provides the content to site application 730. Site application 730 updates cache 720 and delivers the cached content in combination with the accessed content to web layer 710, which delivers browsable content to the user.

FIG. 5 shows a diagrammatic representation of a machine in the exemplary form of computer system 800 within which a set of instructions may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 800 includes processor 850 (e.g., a central processing unit (CPU), a graphics processing unit (GPU) or both), main memory 860 (e.g., read only memory (ROM), flash memory, dynamic random access memory (DRAM) such as synchronous DRAM (SDRAM) or Rambus DRAM (RDRAM), etc.) and static memory 870 (e.g., flash memory, static random access memory (SRAM), etc.), which communicate with each other via bus 595.

Computer system 800 may further include video display unit 810 (e.g., a liquid crystal display (LCD) or a cathode ray tube (CRT)). Computer system 800 also includes alphanumeric input device 815 (e.g., a keyboard), cursor control device 820 (e.g., a mouse), disk drive unit 830, signal generation device 840 (e.g., a speaker), and network interface device 880.

Disk drive unit 830 includes computer-readable medium 834 on which is stored one or more sets of instructions (e.g., software 838) embodying any one or more of the methodologies or functions described herein. Software 838 may also reside, completely or at least partially, within main memory 860 and/or within processor 850 during execution thereof by computer system 800, main memory 860 and processor 850 also constituting computer-readable media. Software 838 may further be transmitted or received over network 890 via network interface device 880.

While computer-readable medium 834 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method, performed by one or more computing devices, for delivering browsable content over a computer network, said method comprising:
    receiving, by at least one of the one or more computing devices, a query for a content item based on identification of at least one of a product and a service, the content item including at least one editorial review describing one of the product and the service;
    aggregating, by at least one of the one or more computing devices, a first plurality of related content items, each content item in the first plurality of related content items having at least one attribute in common with the content item;
    transmitting, by at least one of the one or more computing devices, for display on one of the computing devices the content item in a first user interface portion and at least two content items in the first plurality of related content items in a second user interface portion adjacent to the first user interface portion;
    providing, by at least one of the one or more computing devices, one or more browsing user interface controls on one of the computing devices configured to allow the user to navigate among the first plurality of related content items without selecting one of the content items;
    providing, by at least one of the one or more computing devices, a selection user interface control on one of the computing devices configured to facilitate selection of one of the content items in the first plurality of related content items;
    receiving, by at least one of the one or more computing devices, a selection of one of the content items in the first plurality of related content items;
    aggregating, by at least one of the one or more computing devices, a second plurality of related content items in response to receiving the selection of one of the content items in the first plurality of content items, each content item in the second plurality of related content items having at least one attribute in common with the selected content item; and
    transmitting, by at least one of the one or more computing devices, for display on one of the computing devices the selected content item in the first user interface portion and at least two content items in the second plurality of related content items in the second user interface portion.

2. The method of claim 1, wherein the content item includes one of a description relating to a product, a graphic relating to a product, an evaluation relating to a product, and a symbol relating to a product.

3. The method of claim 2, wherein the product is digital content.

4. The method of claim 1, wherein a browsing user interface control allows the user to navigate among the first plurality of related content items by clicking.

5. The method of claim 1, wherein the first plurality of related content items in the second user interface portion are sorted according to an attribute common to the plurality of content items, and
    wherein aggregating the second plurality of related content items in response to receiving the selection of one of the content items in the first plurality of content items includes aggregating at least one content item having a price higher than a price of the selected one of the content items in the first plurality of content items and at least one content item having a price lower than the price of the selected one of the content items in the first plurality of content items.

6. The method of claim 1, wherein the first plurality of related content items in the second user interface portion are sorted according to an attribute common to the plurality of content items, and
    wherein aggregating the second plurality of related content items in response to receiving the selection of one of the content items in the first plurality of content items includes aggregating related content items that each include an attribute exclusive to that content item within the second plurality of content items.

7. The method of claim 1, further comprising a learning engine configured to:
    store a plurality of user preferred attributes identified based on a plurality of past user selections; and
    refine the aggregation of the second plurality of related content items to reflect the plurality of user preferred attributes.

8. The method of claim 1, further comprising:
    transmitting for display a previously selected content item in a third user interface portion adjacent to the first user interface portion; and
    providing a back user interface control configured to allow the user to navigate back to the previously selected content item.

9. A system for delivering browsable content over a computer network, the system comprising:
    a memory; and
    a processor operatively coupled to the memory, the processor configured to perform the method:
        receiving a query for a content item based on identification of at least one of a product and a service, the content item including at least one editorial review describing one of the product and the service;
        aggregating a first plurality of related content items, each content item in the first plurality of related content items having at least one attribute in common with the content item;
        transmitting for display on one of the computing devices the content item in a first user interface portion and at least two content items in the first plurality of related content items in a second user interface portion adjacent to the first user interface portion;

providing one or more browsing user interface controls on one of the computing devices configured to allow the user to navigate among the first plurality of related content items without selecting one of the content items;

providing a selection user interface control on one of the computing devices configured to facilitate selection of one of the content items in the first plurality of related content items;

receiving a selection of one of the content items in the first plurality of related content items;

aggregating a second plurality of related content items in response to receiving the selection of one of the content items in the first plurality of content items, each content item in the second plurality of related content items having at least one attribute in common with the selected content item; and transmitting for display on one of the computing devices the selected content item in the first user interface portion and at least two content items in the second plurality of related content items in the second user interface portion.

10. The system of claim 9, wherein the first plurality of related content items in the second user interface portion are sorted according to an attribute common to the plurality of content items, and wherein aggregating the second plurality of related content items in response to receiving the selection of one of the content items in the first plurality of content items includes aggregating at least one content item having a price higher than a price of the selected one of the content items in the first plurality of content items and at least one content item having a price lower than the price of the selected one of the content items in the first plurality of content items.

11. The system of claim 9, wherein the first plurality of related content items in the second user interface portion are sorted according to an attribute common to the plurality of content items, and wherein aggregating the second plurality of related content items in response to receiving the selection of one of the content items in the first plurality of content items includes aggregating related content items that each include an attribute exclusive to that content item within the second plurality of content items.

12. The system of claim 9, the processor further configured to perform the method:

storing a plurality of user preferred attributes identified based on a plurality of past user selections; and refining the aggregation of the second plurality of related content items to reflect the plurality of user preferred attributes.

13. The system of claim 9, the processor further configured to perform the method:

transmitting for display a previously selected content item in a third user interface portion adjacent to the first user interface portion; and providing a back user interface control configured to allow the user to navigate back to the previously selected content item.

14. A non-transitory computer-readable medium having computer-readable code stored thereon that, when executed, performs a method:

receiving a query for a content item based on identification of at least one of a product and a service, the content item including at least one editorial review describing one of the product and the service;

aggregating a first plurality of related content items, each content item in the first plurality of related content items having at least one attribute in common with the content item;

transmitting for display on one of the computing devices the content item in a first user interface portion and at least two content items in the first plurality of related content items in a second user interface portion adjacent to the first user interface portion;

providing one or more browsing user interface controls on one of the computing devices configured to allow the user to navigate among the first plurality of related content items without selecting one of the content items;

providing a selection user interface control on one of the computing devices configured to facilitate selection of one of the content items in the first plurality of related content items;

receiving a selection of one of the content items in the first plurality of related content items;

aggregating a second plurality of related content items in response to receiving the selection of one of the content items in the first plurality of content items, each content item in the second plurality of related content items having at least one attribute in common with the selected content item; and transmitting for display on one of the computing devices the selected content item in the first user interface portion and at least two content items in the second plurality of related content items in the second user interface portion.

15. The medium of claim 14, wherein the first plurality of related content items in the second user interface portion are sorted according to an attribute common to the plurality of content items, and wherein aggregating the second plurality of related content items in response to receiving the selection of one of the content items in the first plurality of content items includes aggregating at least one content item having a price higher than a price of the selected one of the content items in the first plurality of content items and at least one content item having a price lower than the price of the selected one of the content items in the first plurality of content items.

16. The medium of claim 14, wherein the first plurality of related content items in the second user interface portion are sorted according to an attribute common to the plurality of content items, and wherein aggregating the second plurality of related content items in response to receiving the selection of one of the content items in the first plurality of content items includes aggregating related content items that each include an attribute exclusive to that content item within the second plurality of content items.

17. The medium of claim 14, the method further comprising:

storing a plurality of user preferred attributes identified based on a plurality of past user selections; and refining the aggregation of the second plurality of related content items to reflect the plurality of user preferred attributes.

18. The medium of claim 14, the method further comprising:
- transmitting for display a previously selected content item in a third user interface portion adjacent to the first user interface portion; and
- providing a back user interface control configured to allow the user to navigate back to the previously selected content item.

19. The method of claim 1, wherein the editorial content is provided by at least one of a personal consumer and a product tester.

\* \* \* \* \*